J. K. HARRIS.
Hay Loader.
No. 13,908.  Patented Dec. 11, 1855.
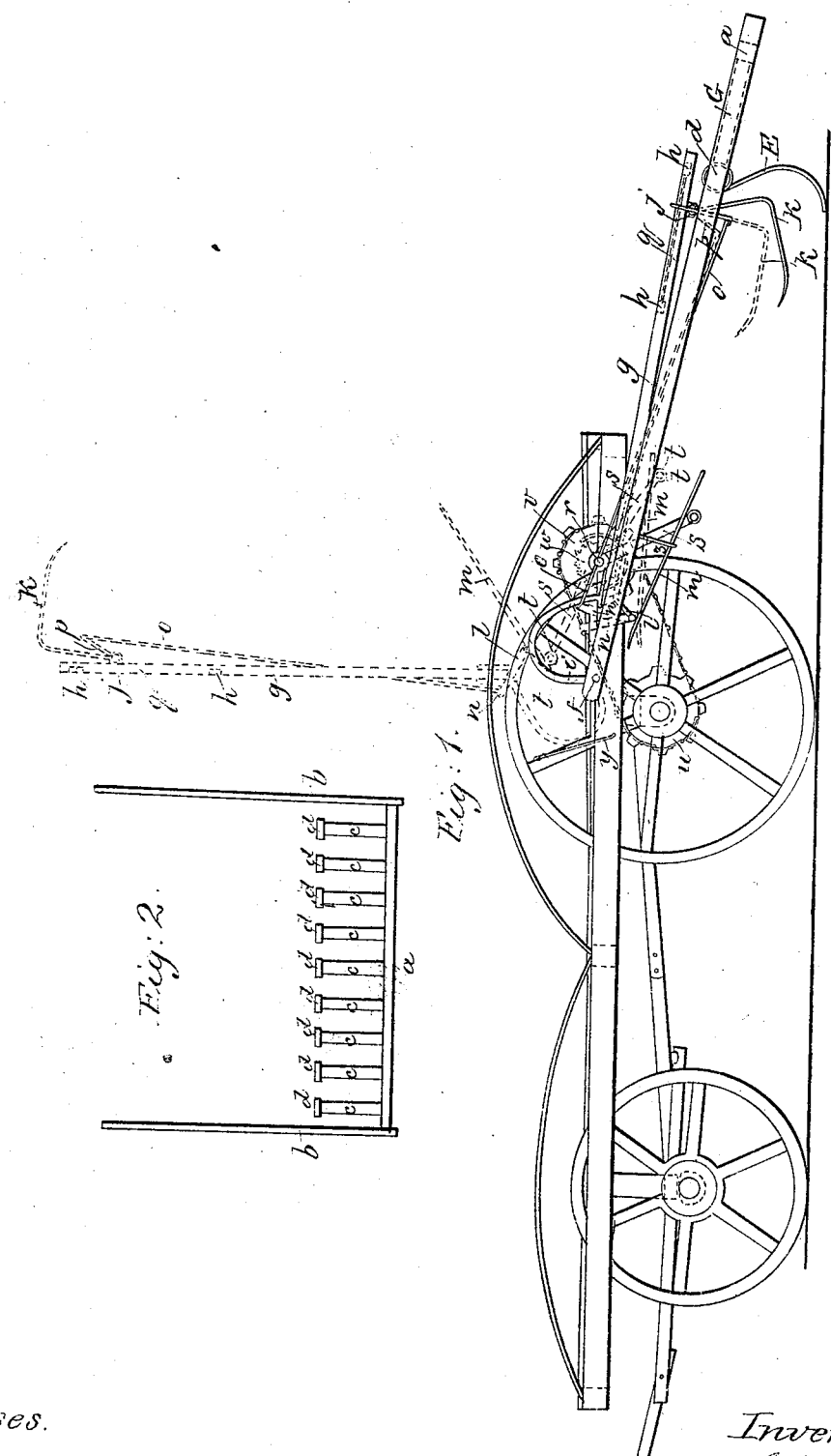

UNITED STATES PATENT OFFICE.

JOHN K. HARRIS, OF ALLENSVILLE, INDIANA.

IMPROVEMENT IN MACHINES FOR RAKING AND LOADING HAY.

Specification forming part of Letters Patent No. 13,908, dated December 11, 1855.

*To all whom it may concern:*

Be it known that I, JOHN K. HARRIS, of Allensville, in the county of Switzerland and State of Indiana, have invented a new and useful Mode or Combination of Devices for Raking and Loading Hay by Machinery; and I do hereby declare that the following is a full, clear, and exact description of the construction and operation of the same, reference being had to the annexed drawings, making a part of this specification, in which—

Figure 1 represents a side view of the whole combined arrangement; Fig. 2, a top view of the peculiar construction of the rake-frame.

The nature of my improvement consists in taking the hay from the rake in regular successive intervals of time and in separate parcels and elevating and delivering it on the wagon by means of the pitcher or elevator, working in combination with the rake—that is, the forks or prongs of the pitcher, passing through and between the teeth of the rake, being operated by one or both hind wheels of the wagon and performing its several motions by the combined arrangement of devices as herein set forth.

To enable others to make and use said improvement, I will proceed to describe its construction and operation.

The peculiar construction of the rake used in this combination is best shown in Fig. 2, letter *a* being the main head, having side pieces, *b b*, attached to each end and projecting forward in the form of thills. This main head has a number of short arm-pieces, *c c*, &c., projecting forward from its front side parallel with each other and with the side pieces or thills, *b b*. On the front end of each arm is attached a short cylindrical head, *d d*, &c., each end of which projects a little beyond the sides of the arm for the purpose of allowing the wire forming the rake-teeth E, Fig. 1, to be coiled around the same, thus forming an open-headed spring-wire rake for the purpose of permitting the forks or prongs of the elevator to pass through and between the teeth unobstructed. The thills *b b* of this rake are attached to the rack of the wagon by joints, as seen at *f*, Fig. 1, and may be attached or detached at pleasure.

The pitcher or elevator is constructed of the side pieces or thills, *g*, connected at one end by the ties or cross-pieces *h h*, and the other ends being joined to the rack of the wagon by the bows *i* at *f*, in common with the rake-thills, thus constituting a light elevating-frame, to which the forked pitcher-head or elevator proper is attached by joints, as shown in the horizontal position of the frame at J and in the perpendicular position at *j*, Fig. 1. The forks K are attached to said pitcher-head at suitable distances apart to correspond with the spaces between the rake-teeth, the handles being bent at nearly right angles, as shown in the drawings, Fig. 1, one fork to every other space being sufficient. Near the end of the side pieces or thills, *g*, and opposite the bows *i*, a short leg, *l*, projects downward to act as a fulcrum for the vibrating lever *m*. This lever is connected near one end by joint to the lower end of the fulcrum-piece *l*, and has an arm, *n*, extending upward from the joint at nearly right angles to itself. This arm is joined by the connection-rod O to the lever P, which is connected to the pitcher-head at J, as shown in the horizontal position of the frame, Fig. 1. The space between the ties *h h* is crossed by wires, as represented by the dotted lines at *q*. The power to operate the pitcher or elevating-frame is obtained from the hind wheels of the wagon in the following manner: I place a shaft, *r*, across the rack of the wagon, behind the wheels. On each end of this shaft is a crank, *s*, of equal length and parallel with each other, having a pin and friction-roller at *t*. Around the hubs of the hind wheels of the wagon, inside the spokes, I attach a knuckled rim, *u*, and in line with this I place a wheel or pulley, *v*, around the shaft, having similar knuckles. These pulleys I allow to turn freely on the shaft in one direction, but to be caught by the ratchet *w* when the motion is reversed. Around these I place a light chain-band, *x*. Now, as the wagon advances forward the various motions and positions of the pitcher, as indicated by the lines drawn with different-colored ink, will be produced. First, the cranks, in their revolution, will come in contact with the long end of the lever *m*, and by elevating it will cause the forks K to assume the position indicated by the lines drawn with blue ink. The hay previously gathered by the forks in their passage through the rake-teeth will now be lifted from the ground and clasped firmly against the front tie-piece, *h*, and wires *q*. The continued motion of the cranks will then cause the pitcher-frame to be elevated (decreasing in leverage as the frame approximates a vertical position) until it acquires a vertical elevation, being tangent to the circle described by the crank. The further motion of the frame being now resisted by spring $y$, the crank will pass the fulcrum-point of lever $m$, and by pressing against the opposite end will cause the forks K to fly back and assume the position indicated by the lines drawn with red ink, thus discharging the hay on the wagon. The crank being now disengaged from lever $m$, the frame, being actuated by the impulse of spring $y$, will commence its descent with increased velocity until the lever $m$ is caught by the stirrup $z$, which projects downward from the rake-thills. The forks K are then forced suddenly through the spaces of the open rake-head, having a peculiar forking motion imparted to them sufficient to force the hay entirely away from the rake-teeth and elevate it from the ground, as shown by the lines drawn with black ink. The cranks, in their second revolution coming again in contact with the levers $m$, cause the forks to grasp the hay more firmly, when it is elevated and discharged, as before described.

Thus it will be seen that the rake will be constantly accumulating the hay from the ground, and will be relieved of its load at each elevation of the pitcher, which also corresponds to each revolution of the wheels of the wagon, so that the quantity of hay taken from the rake and elevated on the wagon by each alternate motion of the pitcher will be about the same as is usually handed up to the loader by hand with an ordinary pitchfork, and by being delivered as taken from the ground in separate parcels and in regular periods of time the hay can be adjusted on the wagon by the loader to much better advantage than when it is taken up in a continuous string by the endless belt or any other continued motion, and for the same reason the hay will be much easier separated in unloading.

The rake and pitcher, having one common attachment to each side of the rack of the wagon, can be easily detached when the wagon is loaded. This attachment also allows the rake to rise or fall with the uneven surface of the ground, while the coil-spring teeth allows them to pass over roots and other obstructions and resume their former position.

I do not claim any form of attachment to the wagon or the manner of forming the spring of the rake-teeth or any continued endless-belt motion with an ordinary rake attached behind to save the hay passed over by the endless-belt elevator; but What I do claim, and desire to have secured by Letters Patent, is—

The pitcher or elevator, in combination with the rake, for the purpose of taking the hay from the rake in regular successive intervals of time and in separate parcels and elevating and delivering it on the wagon, substantially in the manner and for the purpose as described.

JOHN K. HARRIS.

Witnesses:
 P. S. SAGE,
 S. STOW.